United States Patent

Hornung et al.

[11] Patent Number: 5,816,282
[45] Date of Patent: Oct. 6, 1998

[54] VENTILATION DEVICE WITH OPERATING MAGNET

[75] Inventors: Dieter Hornung, Waldmohr; Victor H. Lauer, Nalbach; Andreas Marettek, Sulzback/Saar, all of Germany

[73] Assignee: HYDAC Filtertechnik GmbH, Sulzbach/Sarr, Germany

[21] Appl. No.: 403,860
[22] PCT Filed: May 31, 1994
[86] PCT No.: PCT/EP94/01764
§ 371 Date: Mar. 23, 1995
§ 102(e) Date: Mar. 23, 1995
[87] PCT Pub. No.: WO95/06216
PCT Pub. Date: Mar. 2, 1995

[30] Foreign Application Priority Data

Aug. 20, 1993 [DE] Germany ............. 43 28 043.9

[51] Int. Cl.⁶ ............. F16K 24/04; F16K 31/18
[52] U.S. Cl. ............. 137/202; 137/442
[58] Field of Search ............. 137/192, 202, 137/412; 251/129.14

[56] References Cited

U.S. PATENT DOCUMENTS

| | | | |
|---|---|---|---|
| 3,195,557 | 7/1965 | Young et al. | 137/202 |
| 4,444,217 | 4/1984 | Cummings et al. | 137/195 |
| 4,509,716 | 4/1985 | Barber et al. | 251/129.14 |

FOREIGN PATENT DOCUMENTS

| | | |
|---|---|---|
| 3327846 | 2/1985 | Germany. |
| 58-34279 | 2/1983 | Japan. |

Primary Examiner—Gerald A. Michalsky
Attorney, Agent, or Firm—Roylance,Abrams,Berdo & Goodman,L.L.P.

[57] ABSTRACT

A ventilation device has a housing which can be connected with a fluid system to be ventilated. A float is movable in the housing, and controls a valve through an operating device for a ventilation process. The valve opens and closes a ventilation passage. The operating device has an operating magnet with exciter coil, which can be controlled electrically through a switch operable by the float. The operating magnet, with its switching part, operates to open the valve. The ventilating device can function without disturbance in operation, can be manufactured at low cost, can be used even with very high pressures, and, if necessary, can be monitored from a remote point.

6 Claims, 1 Drawing Sheet

VENTILATION DEVICE WITH OPERATING MAGNET

FIELD OF THE INVENTION

The present invention relates to a ventilation device in a housing, which can be connected with a fluid system to be ventilated. The device has float movable within the housing and controlling a valve through an operating device intended to control a ventilation process.

BACKGROUND OF THE INVENTION

Until this time, ventilation devices have been known to experts in the art in a number of different embodiments. A fluid system is normally closed off or sealed off from the outside, and is under pressure. If a gas (especially air) is separated from a liquid, the liquid level in the housing of the ventilation device connected to the liquid system drops, and thus, the float also drops. The valve of the ventilation device is then operated by means of the operating device to open the valve. All of the accumulated gas can dissipate through the opened valve. A disturbance-free operation of the fluid system can be obtained. The system can be a filter element or a filter system.

For control of the valve for a ventilation procedure, the known ventilation devices (e.g., as disclosed in German Patent No. 33 27 846 A1) generally have a complicated lever arrangement serving as operating device. The lever arrangement is inclined to break down and undergo difficulty in operation, and is expensive to manufacture when incorporated into known constructions. Another basic drawback of these known ventilation devices residing in the aforementioned lever arrangement is that, at high pressures, which can be up to 350 bar, the mechanical constrictions cannot operate the valve piston or the closing mechanism for a ventilating process against these high pressures.

Because of mechanically working structure, remote monitoring of known ventilation devices is generally hardly possible even at appreciable cost. In Japanese Patent No. 58-34279 A, remote monitoring in an air ventilation or exhaust device of the position of a float connected with a lever arrangement can be accomplished by means of a permanent magnet located in the float and by using a switch operable by the magnet. This position monitoring however is not coordinated with action of the mechanical operating device in the form of the known lever arrangement. The lever arrangement, dependent upon the position of the float, opens or closes a ventilation passage provided in the housing. As far as that feature is concerned, this known ventilation device has the same obvious drawbacks already described.

SUMMARY OF THE INVENTION

Objects of the present invention are to provide a ventilation device which can be free of disturbance in operation, can be manufactured at low cost, can be used under very high pressures and can be monitored in its operation from a remote point.

The foregoing objects are basically obtained by a ventilation device comprising a housing having coupling means for connecting the housing to a fluid system to be ventilated, a float movably mount-d in the housing, a float switch mounted in the housing and operatively coupled to the float for actuation by the float, and a ventilation passage in the housing. A valve is movably mounted in the ventilation passage to open and close the ventilation passage. Operating means, in the housing, controls movement of the valve between open and closed settings. The operating means includes an operating magnet with an exciter coil operatively connected to the float switch such that the switch controls activation and deactivation of the coil and with a switching part for moving the valve.

Because the operating device has an operating magnet with the exciter coil controlled electrically through a switch which is in turn controlled by the float, the operating magnet with its switching part operates the valve opening. The use of a costly and easily disrupted power transmission mechanism is avoided. Moreover, the electrically controlled operating magnet can be used at low cost with a minimum of electrical structural parts for a securely operable switching process. Therefore, considerable switching power can be applied, even with small structural space. This power cannot be attained using the known arrangements and devices, even with correspondingly large-size lever arms. Such great operating power is required especially when the ventilation device is attached to filtering or hydraulic circuits in which the gas to be released is under high pressure in the ventilating device.

Furthermore, the ventilating device according to the present invention is especially useful in processing plants of the beverage industry. Beverages containing carbon dioxide, for example, beer and champagne, can let off gas during processing. These gases can negatively influence the effectiveness of the processing.

In one preferred embodiment of the ventilation device according to the present invention, the switching part of the operating magnet has a switching bar. The switching bar opens the closing part of the valve against the effect of an accumulator to produce a connection between the inside of the housing and the surrounding area or environment through the ventilation passage. The switching bar of the operating magnet can be of quite small diameter, and therefore, can securely and safely operate a valve of small structure, making up a small portion of the entirety, for instance, in the form of a spring-biased nonreturn valve.

In another preferred embodiment of the ventilation device of the present invention, the float can be moved along a vertical guide rod and has a reed switch. The reed switch can be operated by a permanent magnet of the float at a predeterminable switching threshold. By the longitudinal guiding of the float and by the reed switch being operable by a permanent magnet, resetting of the operating magnet essentially without any delay at the defined switching threshold is guaranteed. At a defined threshold, a certain volume of air or gas can be conducted out of the device from inside the housing.

In one especially preferred embodiment of the ventilation device of the present invention, the ventilation passage has at least one choke-like or constrictively narrowed throughput point. With this arrangement, a sudden, abrupt ventilation process, which could endanger operating personnel, is avoided, even under high gas pressure. Furthermore, inadvertent leakage of fluid volumes to the outside, escaping with the air current during the ventilation process, can be avoided.

With one more especially preferred embodiment of the ventilation device of the present invention, the ventilation passage opens in a flowthrough direction behind the valve into a radial clearance. The radial clearance is limited by the housing part which retains the operating magnet. As a result of this arrangement, a side discharge flow is attached away from the sensitive portions of the face of the operator.

In another preferred embodiment of the ventilation device of the present invention, the housing part has a plug connection for connection of the operating magnet to the electrical current supply. The current supply can come from a central point and emanate outward, greatly simplifying monitoring of the ventilating device. The plug connection can also connect the ventilation device to a remote central monitoring system.

With another preferred embodiment of the ventilation device of the present invention, the ventilating passage opens into the inside of the housing through a passage end section tapering away from the inside of the housing. The diameter of the end section can be varied by means of a setting device for the guide rod. Whatever the diameter of the actual ventilation passage itself, following each use of the setting device, its diameter can be varied.

With another preferred embodiment of the ventilation device of the present invention, the movement of the float along the guide rod can be limited by the setting device and a stop arranged at the free end of the guide rod. As a result of this structure, the float is held movably between the stop and setting device to facilitate the manufacture of the entire ventilation device.

Since high setting forces can be exerted with the operating magnet and this magnet can be of small design, the ventilating device according to the present invention can be used even in fluid systems to be ventilated where traditionally the area reserved for a similar ventilating device would not be large enough to support a ventilating device of the conventional structure type.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
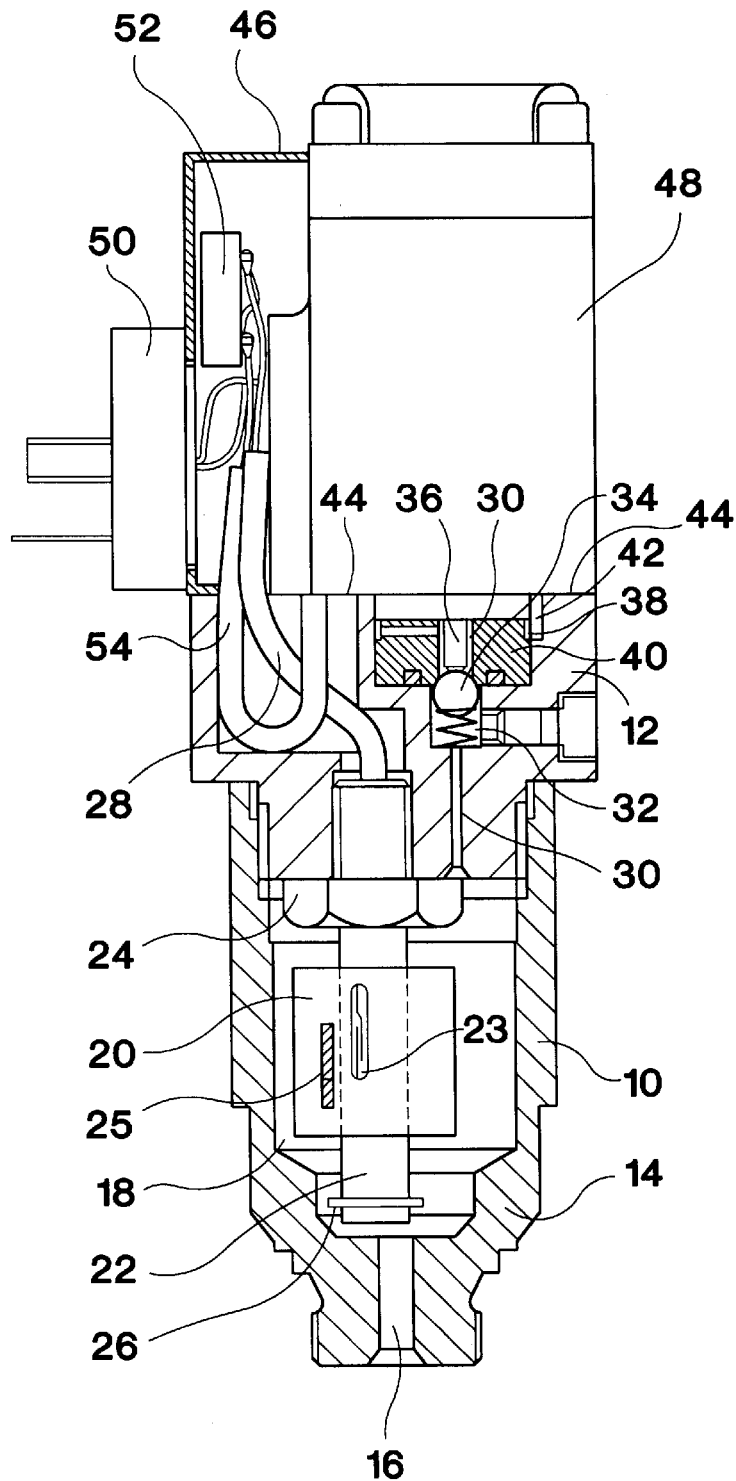
FIG. 1 is a side elevational view partially in section of a ventilation device according to the present invention.

The ventilation device has a housing formed of housing parts 10 and 12. The bottom housing part 10 tapers downwardly. At its bottom, it has a connection pipe or nozzle 14 with outside threading. The ventilation device can be connected to a fluid system of any sort, for example, to a structure in the form of a filter housing (not shown) of a hydraulic system, through the outside threading of connection pipe 14. A connection bore 16 extends in the middle of connection pipe 14, and opens into the inside 18 of housing part 10. The outside contour of housing part 10 is adapted in its shape to the downward taper of the inside 18 which tapers in its diameter from the top downward.

The top end of bottom housing part 10 has an inside threading into which top housing part. 12 can be screwed by means of its outside threading. Bottom housing part 10, with its terminal border or end, forms a stop for the flange-like extension of top housing part 12. A float 20 is movable along a vertically arranged guide rod 22 in bottom housing part 10. Guide rod 22 extends through float 20, while leaving some play between the two. In the movement range of float 20, guide rod 22 has a reed switch 23 which can be operated by a permanent magnet 25 found on float 20. Guide rod 22 has its top end threaded into top housing part 12 and is held tightly in the illustrated position by means of a setting device in the form of a bolt with a nut 24. Guide rod 22 has an annular stop 26 on its free end adjacent connection bore 16. The inside of guide rod 22 is hollow. An electrical connection 28 in the form of a cable is connected to reed switch 23.

A ventilation passage 30 is located adjacent to and parallel to the longitudinal side of guide rod 22. The ventilation passage opens into the inside of bottom housing part 10 where it widens out adjacent to bolt with nut 24 inside bottom housing part 10 and in top housing part 12. According to the direction in which bolt and nut 24 is turned, this can, insofar as is desired, cover a part of the opening cross section of ventilation passage 30, and therewith, can yield a further constriction of the air or gas flow. The other end of ventilation passage 30 opens in valve chamber 32, in which a spring-biased nonreturn valve 34 is illustrated in its closed setting. Ventilation passage 30 continues above valve chamber 32 where a switching bar 36 is held movably therein with space around it. Finally, ventilation passage 30 branches off radially outward and opens in a radial annular clearance 38 limited by a setback portion of a cylindrical inside bushing 40 of top housing part 12 and the top end of top housing part 12. Top housing part 12 has a cylindrical recess to receive inside bushing 40. Annular clearance 38 is also part of ventilation passage 30 and opens in an axial constriction point 42. Connection point 42 opens in turn into a radial clearance 44 of ventilation passage 30 limited by top housing part 12 and a housing part formed by cover 46. Cover 46 holds operating magnet 48 and is screwed into top housing part 12.

The operating magnet 48 is a structural part which can be obtained commercially in various structural sizes and forms, with different operating forces, for example, from the firm Steuerungstechnik GmbH. Thus, reference to operating magnet 48 will be made hereforth only insofar as necessary for explanation of the present invention.

One important component part of operating magnet 48 is an electrically excitable coil, with which a switch part in the form of the switching or solenoid bar 36 can be operated. Operating magnet 48, as shown in the drawing, is arranged such that switching bar 36 is moved downward and opens nonreturn valve 34 upon electrical excitation of the operating magnetic coil. After removal of the voltage from the magnetic coil, under the influence of the power storage or accumulator (in the form of the compression spring of nonreturn valve 34), the valve ball is pressed against its valve seat and switching bar 36 is moved back into its original setting shown in the drawing.

Figure 2:
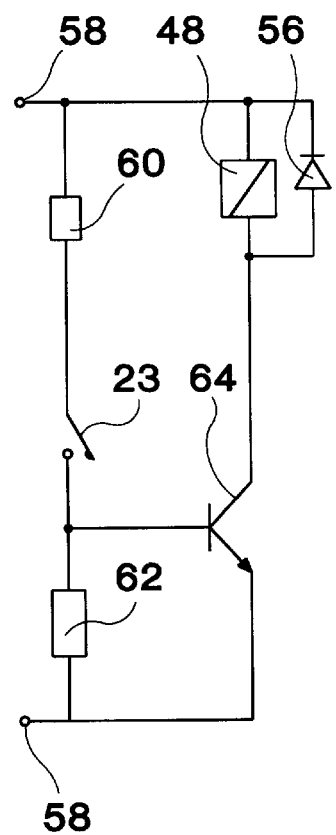
FIG. 2 is a circuit diagram of the electrical component for operating the ventilation device of FIG. 1.

Housing part 46 has a plug connection 50 to connect operating magnet 48 to the current or electrical supply. The electric cable 28 extending from reed switch 23 is connected to an electronic bar 52 controlling the switching processes. The electronic bar in turn extends from a control cable 54 connected to the magnet, for controlling operating magnet 48. The electric circuitry is graphically illustrated in the circuit diagram of FIG. 2. A free-running diode 56 is connected in parallel to switching magnet 48. The entire circuit can be connected through connections 58 to a 24-volt voltage source. In the circuit branch leading to switch 23, shown in an opened state, two resistance's 60 and 62, with 5000 Ohm or 500 Ohm are connected. In addition, the circuit of FIG. 2 is accessible through a switch transistor 64 of traditional structure.

The ventilation device of the present invention operates as follows. If air is separated out of the fluid system, for instance, in the form of a filter housing, the fluid level (not shown) drops in the inside 18 of bottom housing part 10 and float 10 moves downwardly as seen in the drawing. A predeterminable switching threshold or a switching point is dependent upon the air or gas volume stored and present within bottom housing part 10 and is accessible therefrom. By means of permanent magnet 25, float 20 switches reed switch 23 in guide rod 22. Electrical bar 52 of operating magnet 48 is then switched over cables 28 and 54 such that switching bar 36 moves out and moves nonreturn valve 34 into its opened setting. The air accumulated inside bottom housing part 10 can then flow out through ventilation passage 30, annular clearance 38, constriction point 42 and radial clearance 44. This venting causes the fluid level in the inside 18 of bottom housing part 10 to rise again, with the result that float 20 once again operates reed switch 23 and operating magnet 48 is disconnected. Upon disconnection of operating magnet 48, the compression spring operated through the valve ball closes nonreturn valve 34. The ventilation device then is ready for another ventilation process.

While one embodiment has been chosen to illustrate the invention, it will be understood by those skilled in the art that various changes and modifications can be made herein without departing from the scope of the invention as defined in the appended claims.

What is claimed is:

1. A ventilation device, comprising:

a housing having coupling means for connecting said housing to a fluid system to be ventilated;

a float movably mounted alone with a vertical guide rod in said housing, said float including a permanent magnet;

a float switch mounted in said housing and operatively coupled to said float for activation by said float, said float switch including a reed switch operated at a predetermined switching threshold by said permanent magnet;

a ventilation passage in said housing, said ventilation passage including an end section opening inside said housing, said end section having a diameter tapering in a direction away from said float;

setting means for mounting said guide rod and varying a flow-through area of said end section;

a valve movably mounted in said ventilation passage to open and close said ventilation passage; and operating means, in said housing, for controlling movement of said valve between open and closed settings, said operating means including an operating magnet with an exciter coil operatively connected to said float switch such that said float switch controls activation and deactivation of said coil and with a switching part for moving said valve.

2. A ventilation device according to claim 1 wherein an accumulator connected to said valve and biases said valve toward said closed setting; and said switching part comprises a switching bar for moving said valve to said open setting against said accumulator to connect an inside of said housing and a surrounding environment through said ventilation passage.

3. A ventilation device according to claim 1 wherein said ventilation passage comprises at least one constriction point.

4. A ventilation device according to claim 1 wherein said operating magnet is mounted in a housing part, said housing part and said housing defining a radial clearance therebetween; and said ventilation passage opens downstream of said valve in said radial clearance.

5. A ventilation device according to claim 4 wherein said housing part comprises a plug connection for coupling said operating magnet to an electrical current source.

6. A ventilation device according to claim 1 wherein said guide rod comprises a stop arranged at a free end of said guide rod, movement of said float being between and limited by said setting means and said stop.

\* \* \* \* \*